United States Patent [19]
Daly et al.

[11] Patent Number: 5,524,261
[45] Date of Patent: Jun. 4, 1996

[54] VOICE PROCESSOR INTERFACE CHIP WITH ARBITRATION UNIT

[75] Inventors: Daniel F. Daly, Monroe; Thomas C. Grandy, Huntington; Mark N. Harris, New Haven; Salvatore J. Morlando, Easton; Mark Sekas, Orange; Shamla V. Sharma, Norwalk; John J. Dwyer, Stratford, all of Conn.

[73] Assignee: Dictaphone Corporation (U.S.), Stratford, Conn.

[21] Appl. No.: 329,795

[22] Filed: Oct. 26, 1994

Related U.S. Application Data

[63] Continuation of Ser. No. 816,516, Dec. 31, 1991, abandoned, and a continuation of Ser. No. 102,527, Dec. 31, 1991, abandoned.

[51] Int. Cl.⁶ .................................................. G06F 13/14
[52] U.S. Cl. ........................ 395/800; 364/DIG. 1; 364/DIG. 2; 364/237.81; 364/927.8; 364/925.6; 364/927.92; 364/927.93
[58] Field of Search .................. 364/DIG. 1 MS File, 364/DIG. 2 MS File; 395/200, 250, 375, 500, 800, 200.01, 2.12, 2.17, 2.42, 2.44, 2.55, 250, 280, 286, 401, 821, 842

[56] References Cited

U.S. PATENT DOCUMENTS 4,604,683  8/1986  Russ et al. .................... 395/200
4,991,085  2/1991  Pleva et al. ................ 395/DIG. 1
5,072,420  12/1991  Conley et al. .................. 395/425

FOREIGN PATENT DOCUMENTS 2228348  8/1990  United Kingdom.

OTHER PUBLICATIONS

Programming the Z80 by Rodnay Zaks (1982) pp. 65, 91–93.

*Primary Examiner*—Robert B. Harrell
*Attorney, Agent, or Firm*—Curtis, Morris & Safford; Gregor N. Neff

[57] ABSTRACT

An interface chip is capable of receiving requests from two processors and coordinating the flow of the data therebetween. The chip functions as a dual port controller for interaction of associated RAMs and processors of a voice processing system. A plurality of interfaces of the instant invention can be placed in communication with a host computer (PC) of a voice processing system that determines the priority of requests that are received from units of the system. The interface circuits are in communication with the host computer for the purpose of accepting requests in sequence and outputting data over a bus. The host computer is in communication with a RAM interface of each chip that interfaces local peripheral board processor through a dual port RAM which resides on the peripheral board. The interface chip contains the circuitry that creates communication with the resident RAM.

9 Claims, 5 Drawing Sheets

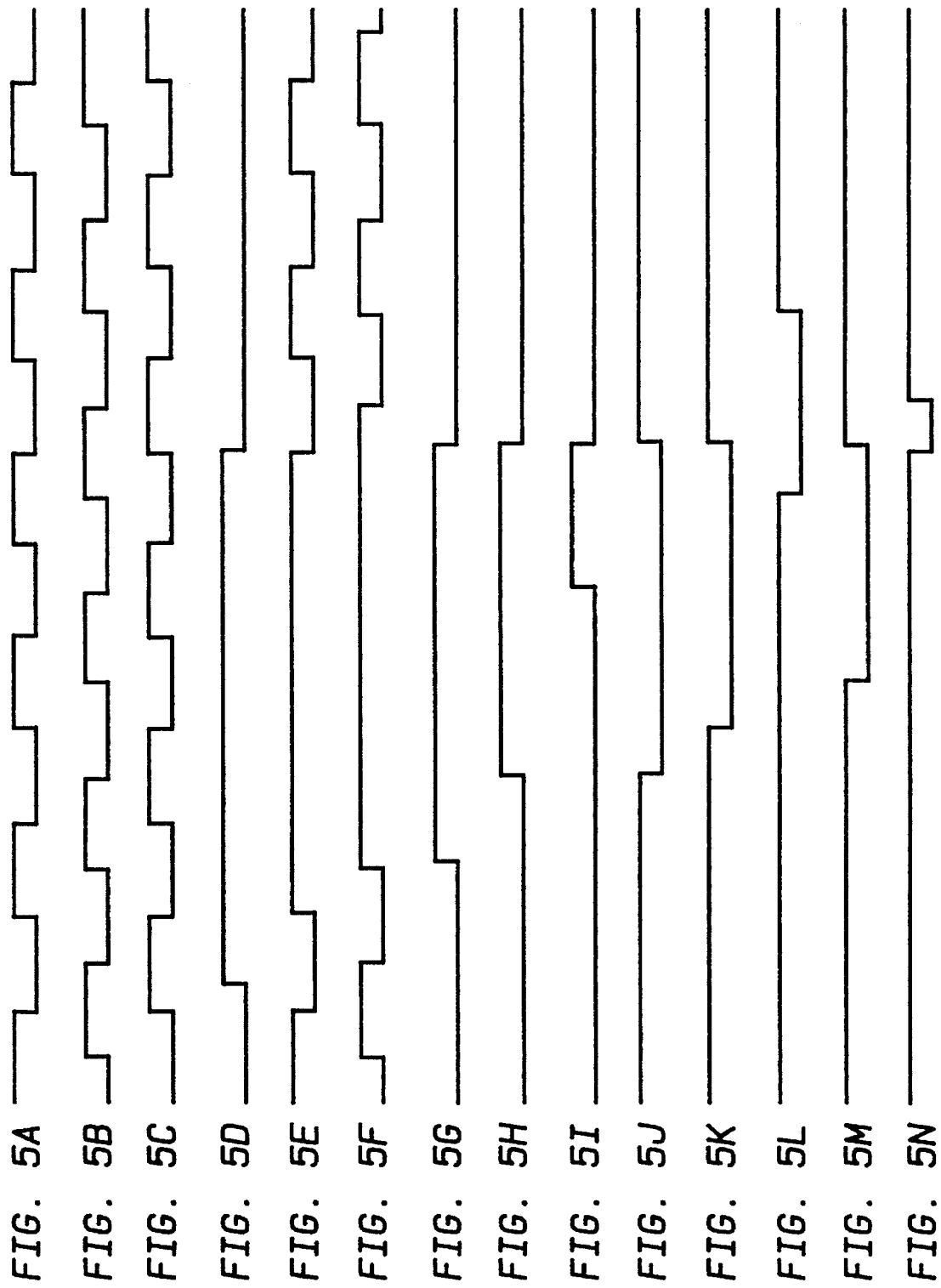

5,524,261

VOICE PROCESSOR INTERFACE CHIP WITH ARBITRATION UNIT

RELATED APPLICATIONS

This is a continuation of application Ser. No. 07/816,516 filed on Dec. 31, 1991 now abandoned and a continuation of patent application U.S. Ser. No. 08,102,527, filed Dec. 31, 1991, now abandoned.

BACKGROUND OF THE INVENTION

In the field of electronic systems, is an interface circuit when is a necessary unit when components of a system are to communicate with one another. Such interface units must serve the function of sending signals to and from the units with which it is in operation and in a manner so that the system is able to operate without malfunctions. This is particularly so in a voice processing system wherein voice data is transferred from a voice processing system to a host computer for the purpose of storing the voice data. Such a system is shown and described in concurrently filed European Patent Application 550274 (U.S. Ser. No. 815,202) and entitled MODULAR DIGITAL VOICE PROCESSING SYSTEM. Unfortunately, suitable interfaces are not available of an acceptable size that are able to perform the functions required with the reliability and speed necessitated in a digital voice processing system. Present state of the art interface circuits required to perform the functions called for in the concurrently filed applications would require to much space to be practicable.

SUMMARY OF THE INVENTION

An interface chip has been conceived and fabricated that has particular utility in a voice processing system. The interface chip is capable of receiving requests from two processors and coordinating the flow of the data therebetween. The chip functions as a dual port controller for interaction of associated RAMs and processors of the system. A plurality of interfaces of the instant invention can be placed in communication with a host computer (PC) of a voice processing system that determines the priority of requests that are received from units of the system. The interface circuits are in communication with the host computer for the purpose of accepting requests in sequence and outputting data over a bus. The host computer unit is in communication with a RAM interface of each chip that interfaces local peripheral board processors through a dual port RAM which resides on the peripheral board. The interface chip contains the circuitry that creates communication with the resident RAM. The interface chip of the instant invention provides high integration, low package density and solutions for interface requirements.

BRIEF DESCRIPTION OF THE DRAWING

FIG. 1.

DETAILED DESCRIPTION OF THE PREFERRED EMBODIMENT

Figure 1:
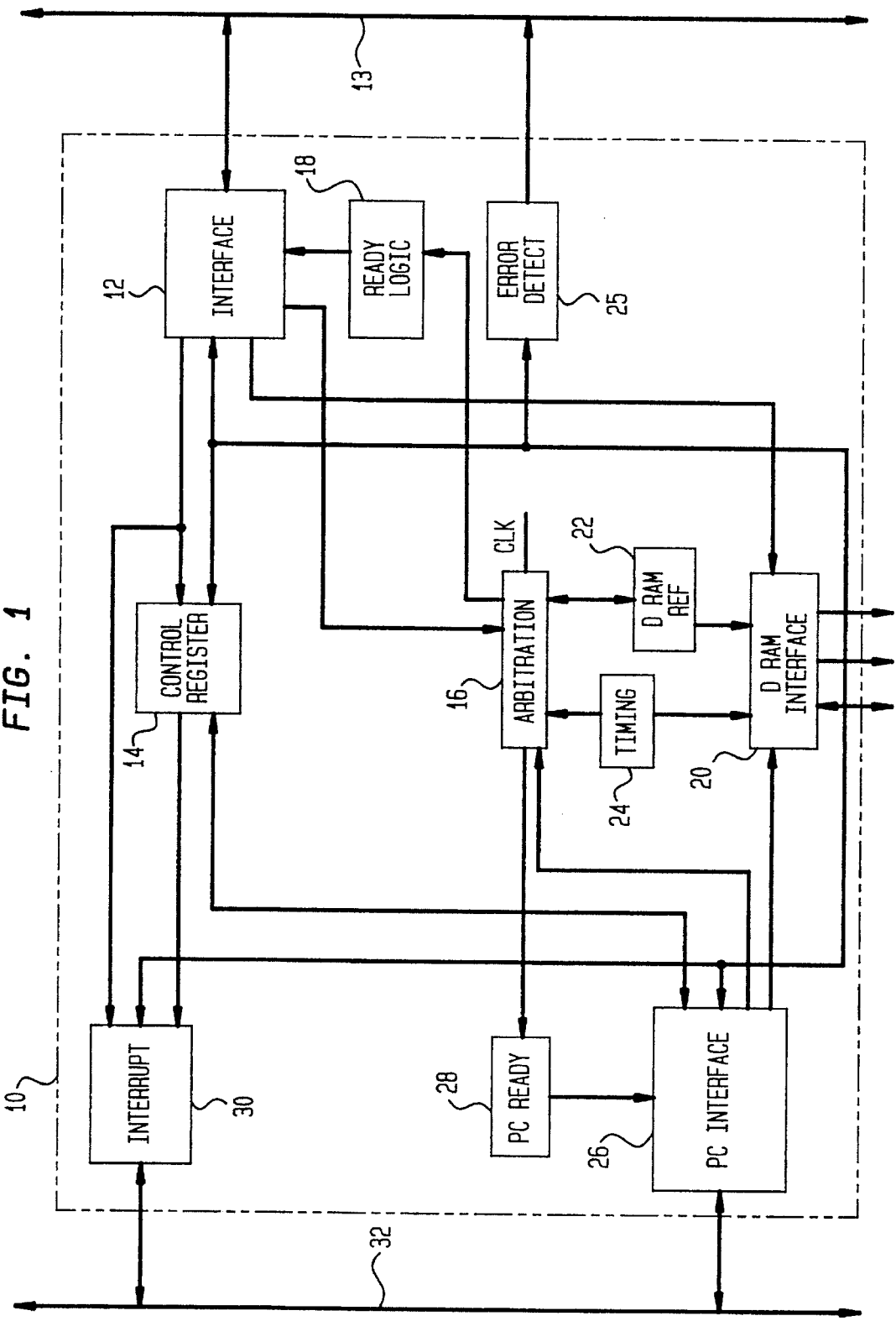
FIG. 1 is a block diagram representing the interface chip of the instant invention.

Referring now to FIG. 1, shown at 10 of FIG. 1 is an interface chip which is compatible with AT and XT IBM computers and that embodies the principals of the instant invention. The interface chip 10 includes an interface logic unit 12 that communicates with a bus 13. It will, be appreciated that the bus 13 is in communication with an embedded control processor such as an Intel 80C186, which is not shown as it does not form part of the instant invention except to the extent that it will transmit requests to the interface chip 10 and receive commands therefrom. A control register 14 and a RAM arbitration logic unit 16 are in communication with the interface logic 12. Intermediate the interface logic 12 and the arbitration unit 16 is a ready logic circuit 18 that determines when data is ready to be transmitted from a DRAM interface circuit 20 to the interface logic 12. The arbitration unit 16 is in communication with a DRAM refresh logic circuit 22 and a timing unit 24. The DRAM interface circuit 20 is in communication with the interface logic circuit 12, the DRAM refresh logic control circuit 22 and a parity error detect logic circuit 25. The DRAM interface 20 is in communication with a RAM (not shown) of a processing circuit board shown and described in concurrently filed application having Ser. No. 07/815,207, filed Dec. 31, 1991, now abandoned, and entitled Digital Signal Processing Circuit Board. The RAM of the circuit board is a DRAM and thus the need for the DRAM refresher 22.

A PC interface unit 26 is in communication with the control register 14, the arbitration unit 16, the DRAM interface 20, with a PC ready logic unit 28, an interrupt unit 30 and a bus 32. The bus 32 will be in communication with a host computer (PC), such as an IBM AT and IBM XT, which does not form part of the invention except to the extent that it will send requests and receive commands over the bus 32. The interrupt unit 30 is also in communication with the bus 32 and with the control register 14 as well.

Figure 2:
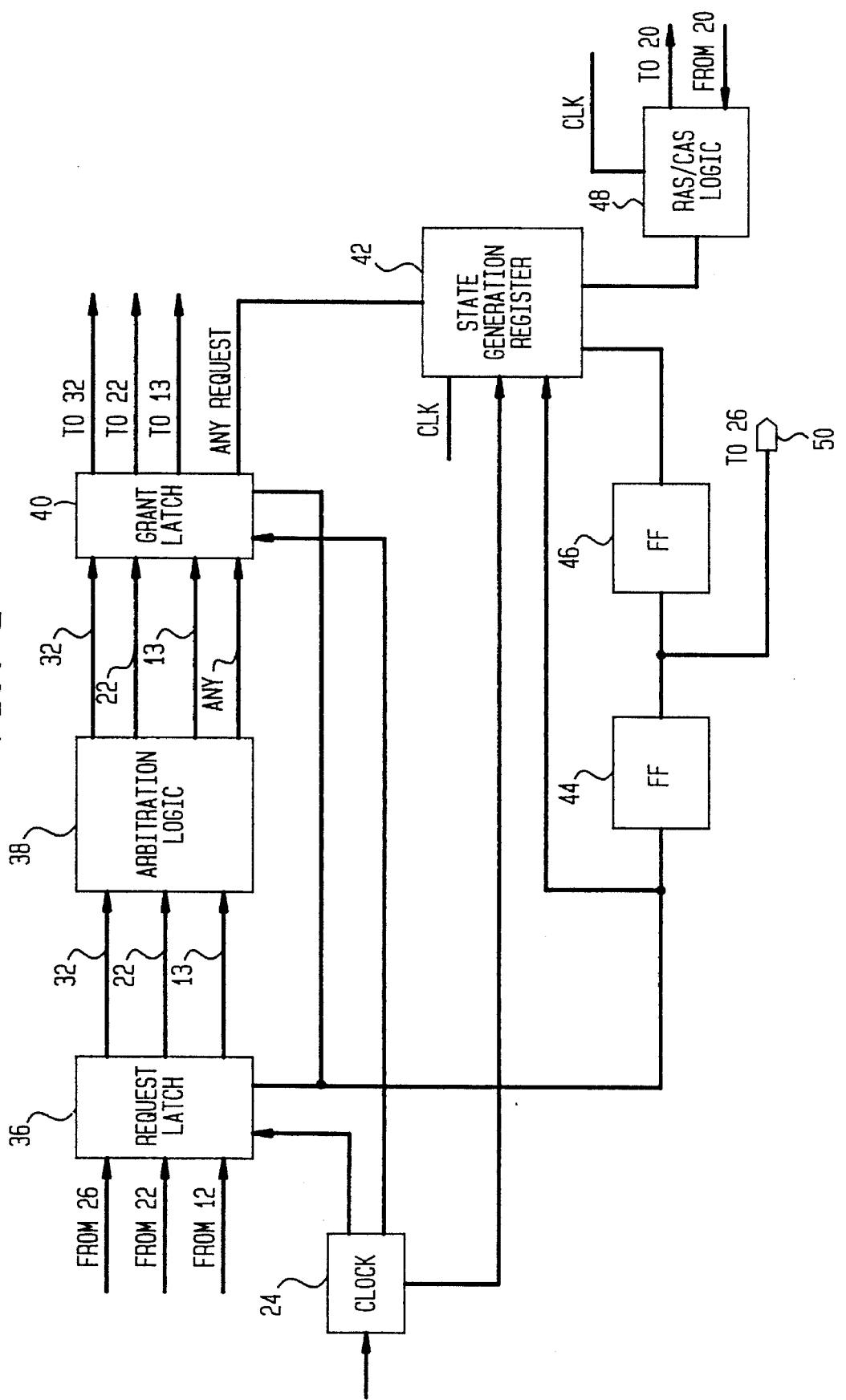
FIG. 2 is a block diagram showing the arbitration unit of FIG. 1 in greater detail.

With reference to FIG. 2 details of the arbitration unit 16 will be described. A request latch 36 is in communication with the interface logic 12, the DRAM refresh 22 and the PC interface 26. This request latch 36 is in communication with an arbitration logic unit 38 that has the same outputs as the inputs to the request latch 36 as well as an "any request" output, all of which input to a grant latch 40. The grant latch 40 is in communication with the buses 13, 32 and with the refresh unit 22 and also has an "any request" output that communicates with a state generator 42.

The state generator 42 receives a clock pulse from the clock circuit 24 and is in communication with a pair of serial flip flops 44 and 46 and a row address strobe/columns address strobe (RAS/CAS) logic circuit 48. The flip flops 44, 46 are also in communication with the request latch 36. The clock circuit 24 is also in communication and with latch read data circuit 50, with the request latch 36 and grant latch 40 and a RAS/CAS logic circuit 48.

Figure 3:
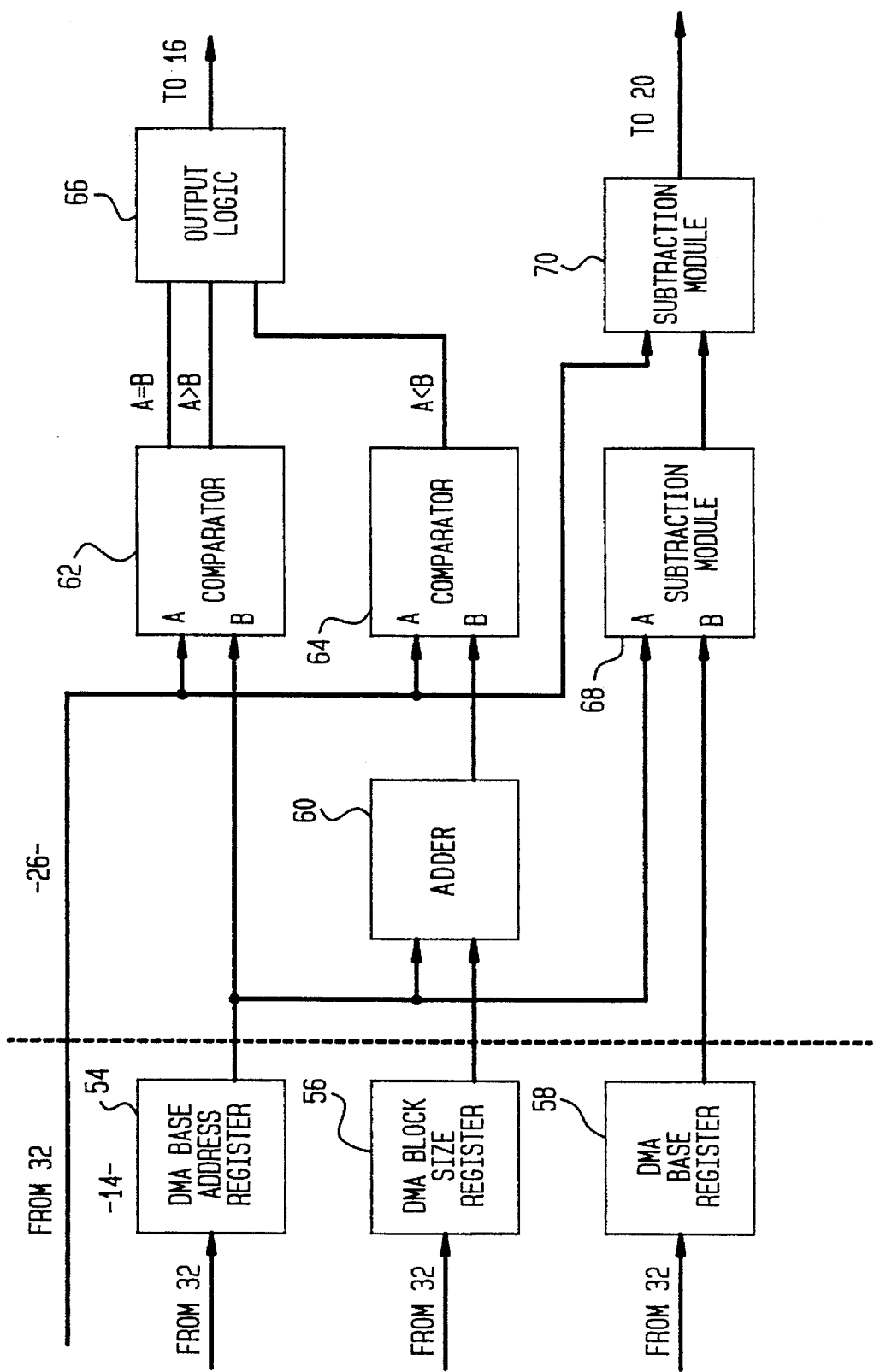
FIG. 3 is a block diagram showing interacting portions of the control register and the PC interface shown in FIG. 1.

FIG. 3 represents the circuit for PC to DRAM address translation and detection of the DMA block area. With reference to FIG. 3, the details of the interface logic 12, the PC interface unit 26 and the cooperation therebetween will be given. The interface unit 26 includes a data memory area (DMA) address register 54, a DMA block size register 56 and a DMA base module register 58 all of which are initialized by the processor attached to the bus 32. The DMA base address register 54 stores the base address of the start DMA. The DMA block size register 56 stores the block size value and the DMA base register 58 stores the values which represent the start of DMA relative to the processor attached to the bus 32.

The DMA base address register 54 and the DMA block size register 56 are in communication with an adder 60 of the PC interface 26. The adder 60 in turn communicates with a comparator 64 which may be a 20 bit comparator. The comparator 64 communicates with the DMA base address 54. A comparator 62 receives PC address signals directly from the bus 32 and signals from the DMA base address register 54 and outputs to an output logic circuit 66. The output from the output logic 66 is sent to the arbitration logic unit 16 and is in the form of a DRAM request. A comparator 64 is also in communication with the adder 60 and with the output logic 66. A first subtraction module 68 is in communication with the DMA base address register 54 and with the DMA base register 58. A second subtraction module 70 is in communication with the first subtraction module 68 and with the DRAM interface 20. The location of the PC is sent directly to the A terminal of the comparator 62 from the bus 32. Terminal B of the comparator is in communication with the DMA base address register 54. If A=B or if A>B, an output is sent from the comparator 62 to the logic unit 66 as with regard to the output of the comparator 64, if indicated. If A<B then an output is sent from the comparator 64 to output logic 66. Such outputs from the comparators 62, 64 means that the PC address values fall within the range defined by the control registers 54, 56, respectively.

Figure 4:
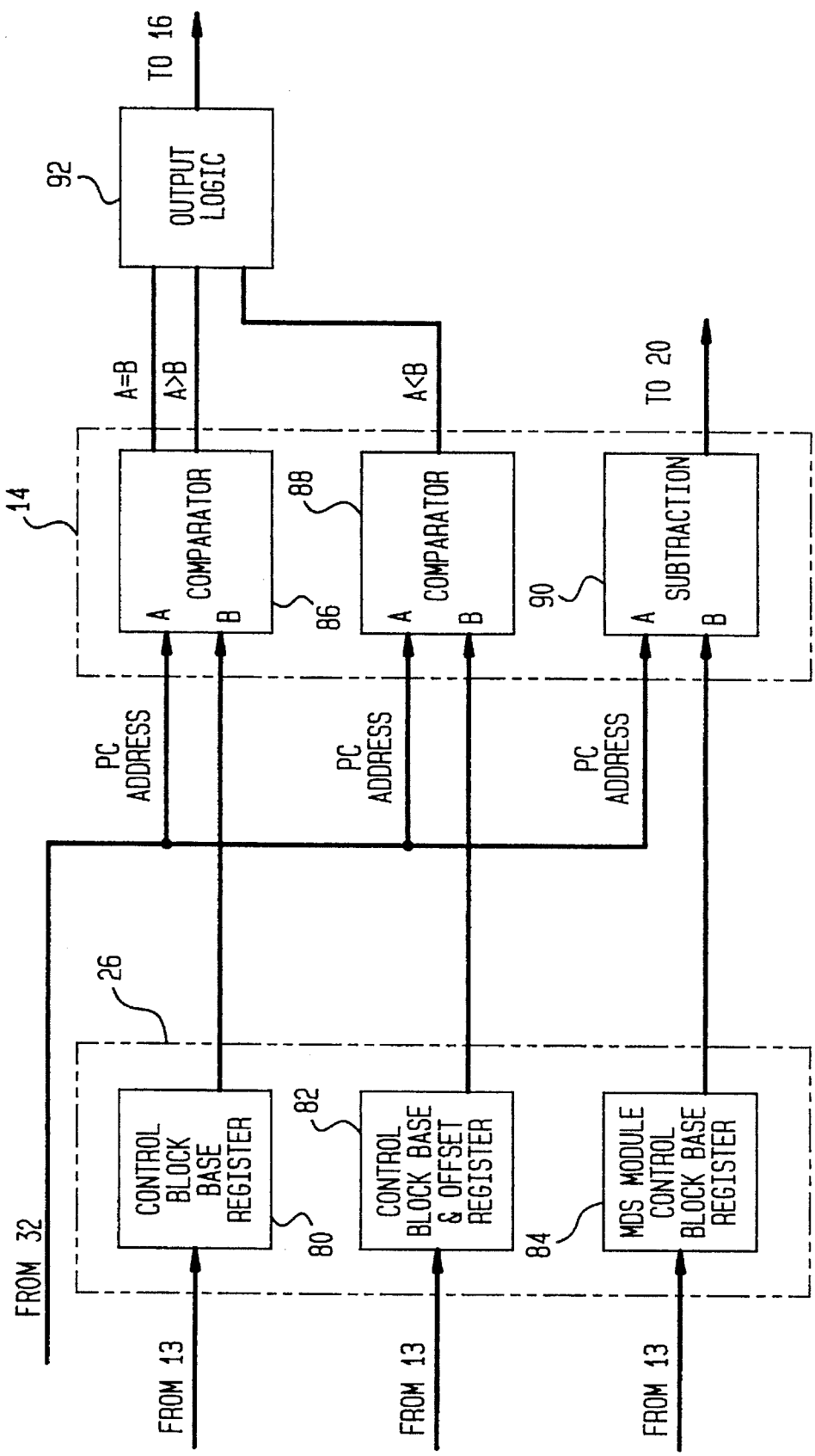
FIG. 4 is a block diagram showing other interacting portions of the control register and interface shown in FIG. 1a, and FIGS. 5A, 5B, 5C, 5D, 5E, 5F, 5G, 5H, 5I, 5J, 5K, 5L, 5M, and 5N are for the interface system shown in timing diagrams.

FIG. 4 represents the circuit for PC to DRAM address translation and detection of the control block area. The operation of the circuitry of FIG. 4 is substantially identical to the operation of the circuitry of FIG. 3 and defines a second portion of peripheral memory to be dual ported for control/status exchange. With reference to FIG. 4, the PC interface includes a control block base register 80, a control block base and offset register 82 and an MDS module control block base register 84 all of which are in communication with the bus 13. The control register 14 includes a comparator 86 which is in communication with the control block base register 80 and with the bus 32. A comparator 88 is in communication with the register 82 and with the bus 32, and a subtracter 90 is in communication with the register 84 and the bus 32. An output logic circuit 92 is in communication with the comparators 86, 88. As stated previously, this circuitry operates in the same manner and for the same purpose as described with reference to FIG. 3 and will not be repeated.

With reference to FIG. 5 the timing diagram associated with the interface unit 10 will be described. FIG. 5A shows the main clock output and 5B shows a delay of the clock output by 20 nanoseconds. FIG. 4C is an inverted clock of the main clock 5A for the state generation register 42 and allows time for "any request" input. FIG. 5D represents the timing cycle for the "any request" grants which represents the output shown in FIG. 2. FIG. 5E is a request clock and is derived from the main clock. FIG. 5F is the grant latch clock and 5G is the clock for the shift register. FIG. 5H is a clock for determining if a signal is true and 5I is a clock for initiating a request. FIG. 5J is a clock for the row address strobe. FIG. 5K is a request for a row/column switch. FIG. 5L is a clock for transmitting data. FIG. 5M is a clock for column address strobe and FIG. 5N is a master clear clock.

In operation, the interface 26 is in communication with the bus 32 and will receive address signals and data signals. The interface will forward the data to the control register 14 and to the arbitration unit 16 which will determine the kind of cycle to be executed. The arbitration unit 16 will then send a signal to the timing circuit 24 which synchronizes data out on the bus 13 and controls data sent to the DRAM interface 20. The address data will be received by the DRAM interface 20 from the interface 12 and from the PC interface 26. The PC interface 26 initially receives requests through the bus 32 and send these requests to the arbitration unit 16 via the interface logic. The error detect unit 25 monitors the access to the DRAM interface 20 from buses 13 and 32 to determine if there is a parity error.

With the DRAM arbitration unit 16 receiving requests from both the bus 13 and bus 32 it must make a determination which of the signals has priority. In the preferred embodiment, requests and commands to and from the bus 32 are given highest priority. As a consequence, when the arbitration unit 16 receives such data, it will move that data ahead of others it receives. Second in priority are the data that are communicated between the arbitration unit 16 and the DRAM refresher 22. Having the lowest priority is the data that is received from and sent to the bus 13. In this way data can flow in a controlled manner so that there is no contention of one unit with another.

Included in the interface chip 10 is an interrupt circuit 30 which serves the function of interrupting the processor attached to bus 32 when the processor on bus 13 is requesting service, but the details of this interrupt circuit are described in co-pending application having Ser. No. 07/815,203, filed Dec. 31, 1991, now abandoned, and entitled INTERRUPT SYSTEM.

Thus what has been shown and described is a dual port, low package density interface chip for the purpose of providing communication between busses that are in communication with various processors of a voice processing system.

What is claimed is:

1. A voice processor interface chip for a voice processing system receiving requests from a processor attached to a first bus and a personal computer processor, which processes voice data, attached to a second bus and coordinating flow of data therebetween, comprising:

an arbitration unit for setting a higher priority to the voice data, being sent to and from the personal computer processor via the first bus, than to data on the second bus;

a first interface unit in communication with said arbitration unit, said first interface unit having a plurality of communication ports for communicating with said second bus;

a second interface unit in communication with said arbitration unit and having a plurality of ports for providing communication with said first bus;

a control register in communication with said first and second interface units and with said arbitration unit for providing control for defining communication character addresses;

a RAM interface in communication with said arbitration unit for storing data including the voice data and exchanging commands and status so that said processor and said personal computer processor can directly access said RAM interface with random access addressing; and a clock connected between and in communication with said arbitration unit and said RAM interface.

2. The voice processor interface chip of claim 1, wherein the arbitration unit further comprises:

a request latch in communication with each of the first interface, the second interface and the RAM interface, for latching requests of access to the voice processor interface chip;

an arbitration logic unit in communication with the request latch for receiving latched requests of access, said arbitration logic unit being programmed to set a highest priority to a flow of data to and from the personal computer processor, which processes the voice data, wherein said arbitration logic unit further outputs an any-request signal representing a request from the arbitration logic unit;

a grant latch for latching a grant signal from the arbitration logic unit representing which of said requests of access is granted, including the any-request signal; and a state generation register receiving a latched signal from the grant latch corresponding to the any-request signal, for generating a state signal from the arbitration logic unit.

3. The voice processor interface chip of claim 2, wherein the arbitration unit further comprises:

a first flip-flop having an input receiving the state signal and an output fed back to the state generation register;

a second flip-flop having an input connected to the output of the first flip-flop, and having an output connected to each of the request latch, the grant latch and the state generation register; and an RAS/CAS logic unit in communication with the state generation register for controlling the DRAM interface.

4. The voice processor interface chip of claim 3 wherein the control register further comprises:

a data memory area base address register for storing a base address from the second bus;

a data memory area block size register for storing a block size from the second bus; and a data memory area base register for storing a base from the second bus.

5. The voice processor interface chip of claim 4, wherein the first interface unit includes an address translator and data memory area block detector comprising:

an adder for adding the base address and the block size from the data memory area base address register and the data memory area block size register, respectively;

a first comparator for comparing a signal on the second bus and the base address of the data memory area base address register;

a second comparator for comparing said signal on the second bus and a result of said adder;

a first subtraction module for subtracting the base address and the base stored in the data memory area base address register and the data memory area base register, respectively;

a second subtraction module for subtracting said signal on the second bus from an output of the first subtraction module, said second subtraction module outputting a result to the second interface unit; and an output logic circuit for outputting a request signal to the arbitration unit, for indicating that a PC address on the second bus falls within a range defined by the data memory area base address register and the data memory area block size register.

6. The voice processor interface chip of claim 1 further comprising an interrupt logic unit in communication with said control register, and said first interface unit.

7. The voice processor interface chip of claim 6 wherein said RAM interface is a DRAM interface.

8. The voice processor interface chip of claim 7, further comprising:

a DRAM refresher connected between said arbitration unit and said DRAM interface for refreshing the DRAM interface.

9. The voice processor interface chip of claim 1 wherein said arbitration unit causes said RAM interface to move the voice data ahead of any data in memory with a lower priority.

* * * * *